United States Patent [19]

Watson

[11] 3,977,632
[45] Aug. 31, 1976

[54] HELICOPTER POWER TRANSMISSION SYSTEMS
[75] Inventor: Kenneth Watson, Yeovil, England
[73] Assignee: Westland Aircraft Limited, Yeovil, England
[22] Filed: Jan. 31, 1975
[21] Appl. No.: 546,109

[30] Foreign Application Priority Data
Feb. 18, 1974 United Kingdom............... 7344/74

[52] U.S. Cl.................................... 244/60; 74/661; 416/170 R
[51] Int. Cl.² ................... B64C 27/12; B64D 35/08
[58] Field of Search ........... 244/60, 17.19; 416/170, 416/123; 74/661, 665 L, 665 M, 665 N

[56] References Cited
UNITED STATES PATENTS
3,129,608  4/1964  Watson ........................ 416/170 X
3,255,825  6/1966  Moville et al. ................. 416/170
3,782,223  1/1974  Watson ........................ 416/170

OTHER PUBLICATIONS
"Design of a Lightweight Split Power Transmission for a 4000-HP Helicopter," G. White, Instn. Mech. Engrs., 1972 Conference, 5–6, Sept., 1972, see p. 125, paragraph 2.2.

Primary Examiner—Trygve M. Blix
Assistant Examiner—Barry L. Kelmachter
Attorney, Agent, or Firm—Larson, Taylor and Hinds

[57] ABSTRACT

This invention relates to power transmission systems for helicopters having two or more engines, the transmission system comprising for each engine, drive shafting and gearing including a final drive gear for transmitting torque from each engine to a common output gear for connection to the rotor system, and an idler gear interconnecting the respective gearings to distribute available torque amongst the full complement of final drive gears. A particular embodiment is shown and described for a twin-engined helicopter in which an additional final drive gear is meshed with the output gear and driven from the idler gear so that, even in the event of an engine failure the available torque from the remaining engine is transmitted through all three final drive gears to the rotor system. In the particular embodiment the drive to the additional final drive gear is also arranged for connection to a tail rotor.

12 Claims, 4 Drawing Figures

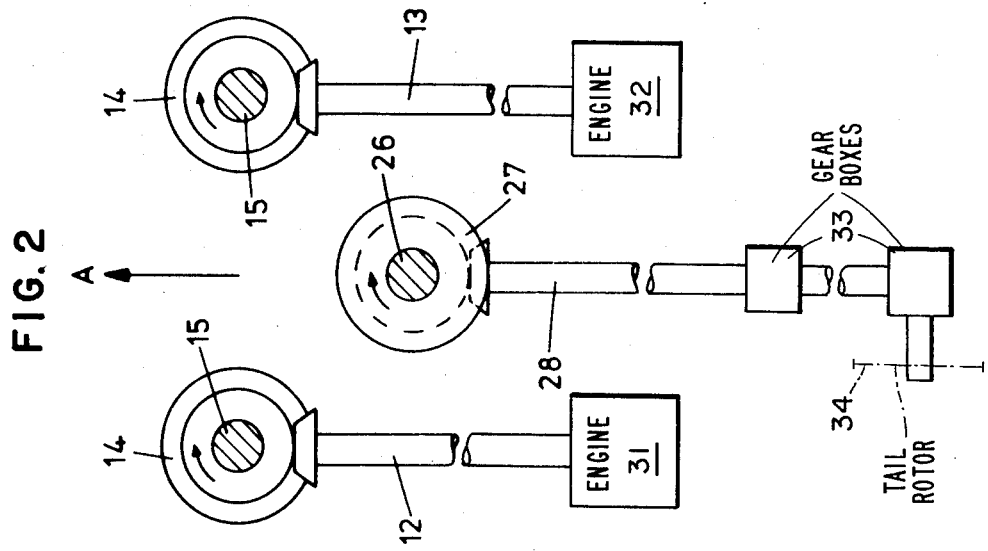
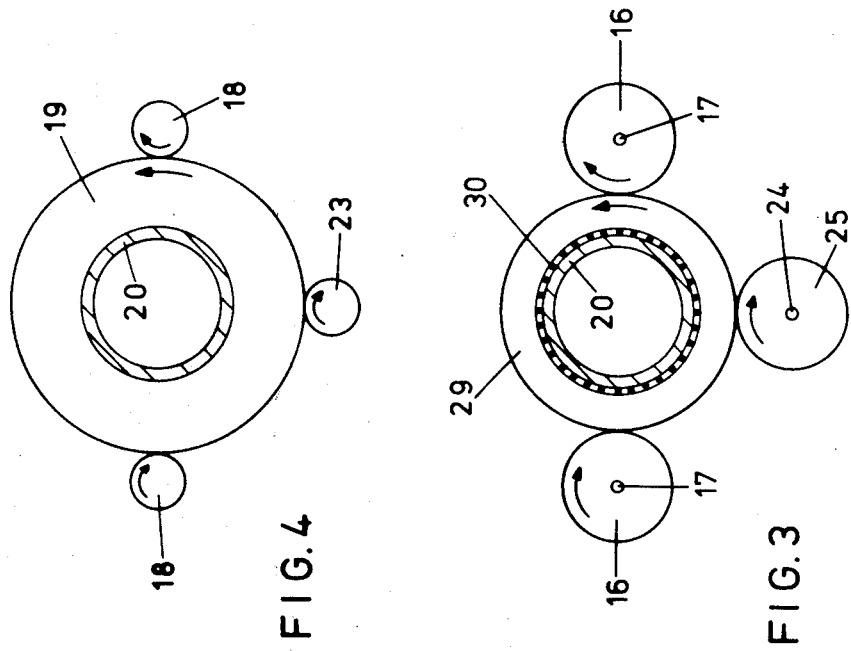

HELICOPTER POWER TRANSMISSION SYSTEMS

This invention relates to helicopter power transmission systems.

For safety reasons it is desirable that twin and multi-engined helicopters should be capable of continued operation if one or more of the engines should fail. In some such helicopters the transmission system is arranged so that the torque output to the rotor system is accomplished through individual final drive gears associated with the respective engines and arranged so that in the event of an engine failure the power from the remaining engine or engines is transmitted through a corresponding reduced number of final drive gears. For instance, in a twin-engined helicopter employing such a system the whole of the remaining available power has to be transmitted through a single final drive gear when one engine fails. This imposes severe limitations on the normal capacity of the transmission because of the fatigue-damaging loading in the single engine case.

According to the invention I provide, in or for a helicopter having a plurality of engines providing shaft power to drive a rotor system, a power transmission system for transmitting torque from the engines to the rotor system and comprising, for each engine, drive shafting and associated gearing including an individual final drive gear for transmitting torque from each engine to a common output gear for connection to the said rotor system, a common idler gear interconnecting the respective gearings to distribute available engine torque amongst the full complement of said final drive gears.

With such a power transmission system, the available engine torque is transmitted through the same number of final drive gears however many engines are operating.

To ensure power sharing amongst the two or more final drive gears, the said drive shafting associated with each engine preferably comprises a torsionally flexible drive shaft part for transmitting torque between said idler gear and the associated final drive gear.

The said drive shafting may include a generally horizontally extending drive shaft for connection to its associated engine, this drive shaft being connected through a bevel gear constituting a first stage speed reduction to a generally vertical upwardly extending first shaft part driving a spur gear in mesh with the said idler gear.

Each said spur gear in such an arrangement may be connected through a generally vertical upwardly extending second shaft part to the associated final drive gear, the said second shaft parts preferably being torsionally flexible to constitute the said torsionally flexible drive shaft parts for power sharing amongst the final drive gears.

Preferably, said final drive gears are pinion gears meshing with the said output gear at spaced-apart positions therearound to provide a second stage speed reduction.

In preferred embodiments, the said output gear is rotationally fixed to and between the ends of a generally vertically extending rotor system drive shaft, the upper end of which may conveniently be arranged for connection to the helicopter rotor system. In such a case, the said idler gear may conveniently be mounted for rotation on the lower end of said rotor system drive shaft.

In preferred embodiments of the invention, at least one further spur gear may be meshed with the said idler gear and may be connected through an individual generally vertical upwardly extending drive shaft to drive a further pinion gear in mesh with the said output gear to provide yet a further torque drive path between the idler and output gears, further to reduce the torque to be transmitted by each final drive pinion gear.

The or one of the said further spur gears may be connected through a generally vertical downwardly extending shaft to a bevel gear arranged to drive a generally horizontally extending output drive shaft for driving a tail rotor.

Thus a preferred embodiment of the invention, applicable to a twin-engined helicopter, provides a power transmission system for transmitting torque from the engines to the rotor system of such a helicopter, said transmission system comprising, for each engine, a generally horizontally arranged drive shaft for connection to the engine, a bevel gear connecting said drive shaft to a generally vertical upwardly extending first shaft part driving a spur gear and, through a generally vertical upwardly extending torsionally flexible second shaft part, a pinion gear, the respective pinion gears being meshed to a common output gear rotationally fixed between the ends of a vertically extending rotor system drive shaft having its upper end arranged for connection to the said helicopter rotor system, an idler gear being mounted for rotation on the lower end of the said rotor system drive shaft and being meshed with each of the said spur gears, a further pinion gear meshing with the said output gear and being connected through a generally vertical downwardly extending torsionally flexible shaft to a further spur gear meshing with the said idler gear, the said further spur gear being connected through a generally vertical downwardly extending shaft to a bevel gear connected to a generally horizontally extending output drive shaft for connection to a tail rotor.

Such an embodiment of the invention is illustrated in the accompanying drawings, in which:

FIG. 2 is a part-sectional view on lines A—A of FIG. 1;

FIG. 3 is a part-sectional view on lines B—B of FIG. 1; and

FIG. 4 is a part-sectional view on lines C—C of FIG. 1.

Figure 1:
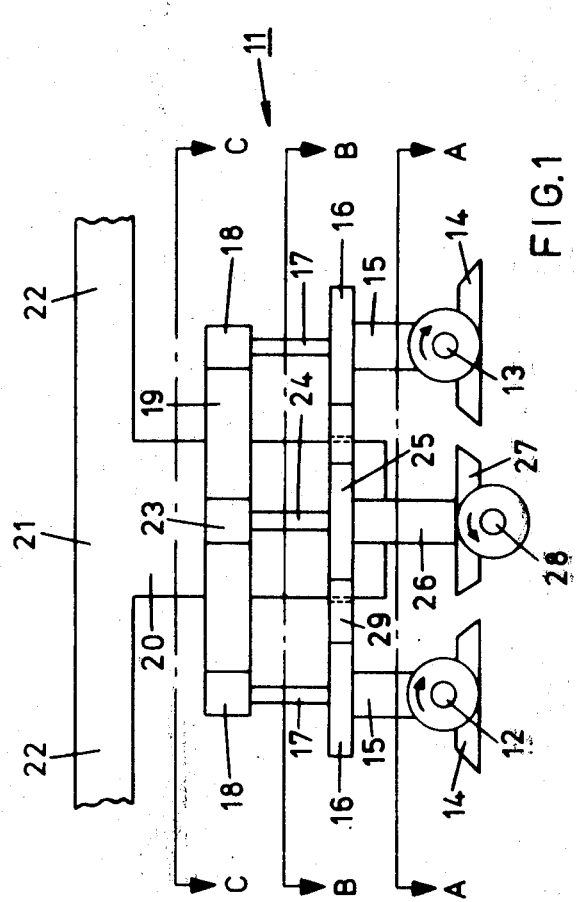
FIG. 1 is an end view of a power transmission system, in accordance with the invention, for a twin-engined helicopter.

The illustrated power transmission system for a twin-engined helicopter is generally indicated at 11 in FIG. 1 and comprises generally horizontally extending drive shafts 12 and 13 arranged for connection, respectively, to first and second engines 31 and 32 (FIG. 2). Each drive shaft 12 and 13 drives a bevel gear 14, a generally vertical upwardly extending first shaft part 15, a spur gear 16 (FIGS. 1 and 3), a generally vertical upwardly extending torsionally flexible second shaft part 17 and a final drive gear in the form of a pinion gear 18 (FIGS. 1 and 4).

The two pinion gears 18 are spaced-apart around the periphery of an output gear 19 with which they are in mesh, the output gear 19 being rotationally fixed between the ends of a generally vertically extending hollow rotor system drive shaft 20 arranged for connection at its upper end to a rotor hub 21 (FIG. 1) having a plurality of radially extending arms 22 for the attachment of main rotor blades.

A third pinion gear 23 (FIGS. 1 and 4) also meshes with the output gear 19 at a position spaced-apart from the pinion gears 18 and is connected, like the gears 18, through a torsionally flexible drive shaft 24 to a spur gear 25 (FIGS. 1 and 3) and thence to a shaft 26 and bevel gear 27 (FIGS. 1 and 2) driving a horizontally arranged output shaft 28 arranged for connection, via suitable further shafting and gear boxes 33, to a tail rotor 34.

Referring to FIGS. 1 and 3, it will be seen that the two spur gears 16 and the spur gear 25 are individually meshed with an idler gear 29 which, in the embodiment shown, is mounted on a bearing 30 adjacent to the lower end of the shaft 20 for independent concentric rotation on that end of the shaft 20.

Freewheel devices (not shown) are provided in the drive shafts 12 and 13 to permit single engine operation and autorotation procedures.

In normal twin-engined operation of the illustrated transmission system, each drive shaft 12 and 13 is driven in the direction of the arrows shown in FIG. 1 by its respective engine 31 or 32. Load sharing between the engines is provided by the interconnected gear train comprising the spur gears 16 and the idler gear 29, and load sharing amongst the pinion gears 18 and 23 is provided by the torsionally flexible drive shaft parts 17 and 24 driven from the relatively stiff interconnecting gear train. Power for driving the output shaft 28, which is connected to drive a tail rotor 34, is taken through spur gear 25 and bevel gear 27.

The arrangement is such that during normmal twin-engined operation the power path from each engine is split after the bevel gears 14 so that two-thirds of the available power from each engine goes direct to its associated pinion gear 18, while the remaining one-third available power from each engine is transmitted by the idler gear 29 to the spur gear 25 and thence to the pinion gear 23 and the shaft 28. Thus, during twin-engined operation, the final drive to the output gear 19 is shared between the pinion gears 18 and 23.

In the case of single-engine operation, one-third of available power from the operating engine goes direct to the associated pinion gear 18, while the remaining two-thirds of available power is transferred through the interconnected gear train to be distributed between the other pinion gear 18 and the pinion gear 23 so that in this case also the available power to drive the output gear 19 is shared between the three pinion gears meshing with the output gear 19.

For the reason that at all times the available engine power is distributed amongst the full complement of final drive pinion gears, as explained, the transmission enables an uprated single engine performance to be provided with a design based on the twin-engine power condition. The alternative power paths from each engine provided in a transmission system according to the invention give additional safety features for twin-engined helicopters, enabling both engines to continue to drive the output gear under various failure conditions that in prior art arrangements would disable the power path from one engine. For instance a failure in one of the torsionally flexible drive shafts, 17, 24 will not disable the power path from either engine. Moreover, the drive for the tail rotor is also covered by an alternative power path as, in the event of a failure in the interconnecting gearing normally providing the drive, this would automatically revert to the drive path condition operative during autorotation when both engines are out of operation and in which the gearing 27 is driven from the output gear 19 through the pinion gear 23.

The embodiment of the invention hereinbefore described is designed for mounting above a helicopter fuselage for connection to two generally horizontally extending engines, the forward end of the fuselage being in the direction of arrow A (FIG. 2). The configuration shown, in which the necessary speed reduction is accomplished in two stages only - the first stage comprising the bevel gears 14 and the second stage comprising helical conformal tooth forms on the pinion gears and the large diameter output gear 19 - results in a compact shallow assembly ideally suited for this type of installation.

It should be understood that additional pinion gears can readily be provided around the output gear 19 with connection through torsionally flexible drive shafts to spur gears meshing with the idler gear 29, thereby to provide additional power paths amongst which the available engine power is distributed. Furthermore, the invention is not limited to use in twin-engined helicopters and will provide advantageous load sharing between any desired number of final drive gears in helicopters having more than two engines, both during normal multi-engine operation and during operation with one or more engines shut down.

I claim as my invention:

1. In or for a helicopter having a plurality of engines providing shaft power to drive a rotor system, a power transmission system for transmitting torque from the engines to the rotor system and comprising, for each engine, drive shafting and associated gearing including an individual final drive gear for transmitting torque from each engine to a common output gear for connection to the said rotor system, a common idler gear interconnecting the respective gearings and a torsionally flexible drive shaft for transmitting torque between the idler gear and each said final drive gear so as to distribute available engine torque amongst the full complement of said final drive gears.

2. The combination claimed in claim 1, wherein said drive shafting for each engine includes a generally horizontally extending drive shaft connected through a bevel gear to a generally vertical upwardly extending first shaft part driving a spur gear in mesh with the said idler gear.

3. The combination claimed in claim 2, wherein each said spur gear is connected through a generally vertical upwardly extending second shaft part to the associated final drive gear, said second shaft parts comprising said torsionally flexible drive shafts.

4. The combination claimed in claim 3, wherein said final drive gears are pinion gears meshing with said output gear at spaced-apart positions therearound.

5. The combination claimed in claim 4, wherein said output gear is rotationally fixed to and between the ends of a generally vertically extending rotor system drive shaft.

6. The combination claimed in claim 5, wherein the upper end of said rotor system drive shaft is arranged for connection to said helicopter rotor system and the said idler gear is mounted for rotation about the lower end of said shaft.

7. The combination claimed in claim 4, wherein a further spur gear is meshed with said idler gear and is connected through an individual generally vertical upwardly extending torsionally flexible shaft to an associated pinion gear in mesh with the said output gear.

8. The combination claimed in claim 7, wherein said further spur gear is connected through a generally vertical downwardly extending shaft to a bevel gear arranged to drive a generally horizontally extending output drive shaft.

9. The combination claimed in claim 8, wherein said output drive shaft is arranged for connection to a tail rotor.

10. In or for a twin-engined helicopter, a power transmission system for transmitting torque from the engines to a rotor system, said transmission system comprising, for each engine, a generally horizontally arranged drive shaft for connection to the engine, a bevel gear connecting said drive shaft to a generally vertical upwardly extending first shaft part driving a spur gear and, through a generally vertical upwardly extending torsionally flexible second shaft part, a pinion gear, the respective pinion gears being meshed to a common output gear rotationally fixed between the ends of a vertically extending rotor system drive shaft having its upper end arranged for connection to said helicopter rotor system, an idler gear being mounted for rotation on the lower end of said rotor system drive shaft and being meshed with each of said spur gears, a further pinion gear meshing with said output gear and being connected through a generally vertical downwardly extending torsionally flexible shaft to a further spur gear meshing with said idler gear, said further spur gear being connected through a generally vertical downwardly extending shaft to a bevel gear connected to a generally horizontally extending output drive shaft for connection to a tail rotor.

11. In or for a helicopter having a plurality of engines providing shaft power to drive a rotor system, a power transmission system for transmitting torque from the engines to the rotor system and comprising, for each engine, drive shafting and associated gearing including an individual final drive gear for transmitting torque from each engine to a common output gear for connection to the said rotor system, a common idler gear interconnecting the respective gearings to distribute available engine torque amongst the full complement of said final drive gears, each said drive shafting including a generally vertically extending first shaft part including a first gear in mesh with said idler gear and a generally vertically extending second shaft part extending to its respective final drive gear which meshes with the output gear at spaced-apart locations therearound, and said output gear being rotationally fixed to and between the ends of a generally vertically extending rotor system drive shaft.

12. The combination in claim 11, said idler gear being coaxial with said output gear.

* * * * *